Oct. 18, 1955  W. J. STRONG ET AL  2,720,908
METHOD OF SPLICING TUBULAR ARTICLES
Filed Sept. 6, 1952  2 Sheets-Sheet 1
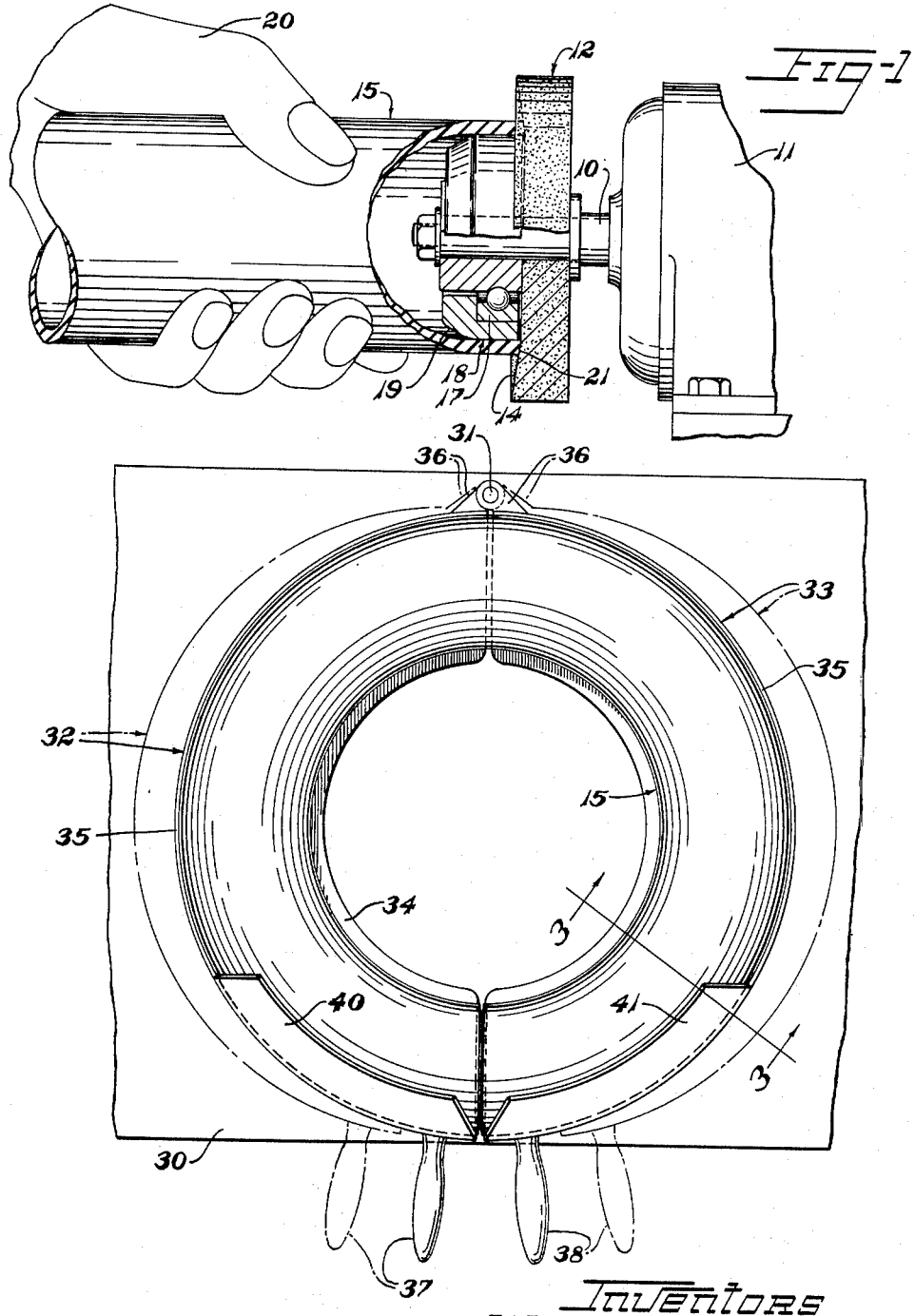
Inventors
Walter J. Strong
Amil A. Hanson
By C. E. Tripp Atty Oct. 18, 1955     W. J. STRONG ET AL     2,720,908
METHOD OF SPLICING TUBULAR ARTICLES
Filed Sept. 6, 1952     2 Sheets-Sheet 2
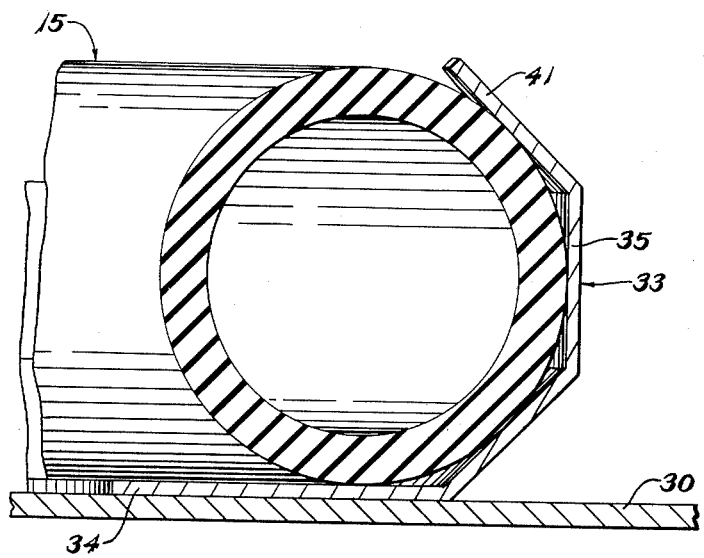
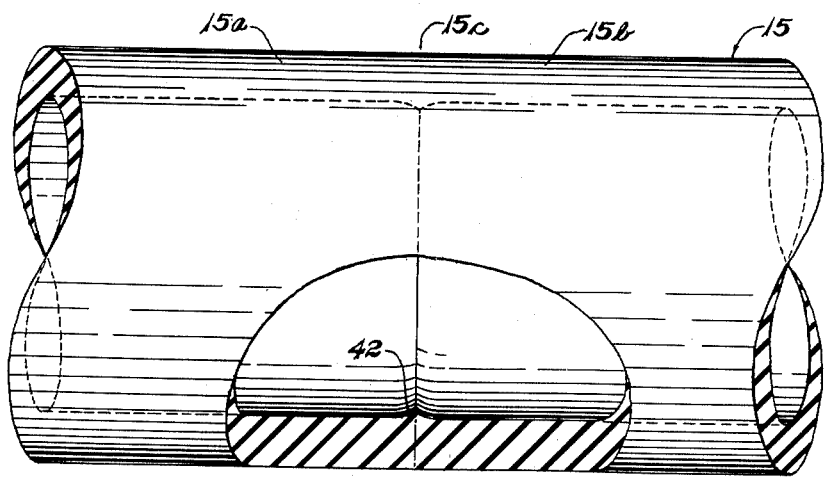
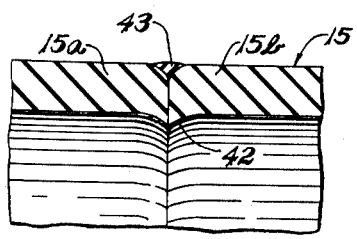
Inventors
Walter J. Strong
Amil A. Hanson
By C. E. Tripp
Atty

United States Patent Office 2,720,908
Patented Oct. 18, 1955

2,720,908

METHOD OF SPLICING TUBULAR ARTICLES

Walter J. Strong and Amil A. Hanson, Cuyahoga Falls, Ohio, assignors to The B. F. Goodrich Company, New York, N. Y., a corporation of New York Application September 6, 1952, Serial No. 308,232

3 Claims. (Cl. 154—14)

This invention relates to the splicing of thick-walled tubular articles of unvulcanized rubber material and is especially useful in the splicing of tubular material in the manufacture of curing bags used in curing tires by use of internal pressure.

In the manufacture of pneumatic tires, a thick-walled bag of vulcanized rubber is inserted within the unvulcanized tire casing, the assembly is enclosed within a mold cavity, and the bag is inflated while heat is applied to the mold. The bag forces the tire casing to conform to the mold and stretches the cord material of the tire.

Heretofore, in the manufacture of curing bags, a thick-walled tube of unvulcanized rubber has been formed by extrusion, the tube has been cut to length and one end of the tube has been skived or beveled on the inside by paring away rubber with a hand knife. The other end has been skived on the outside to fit within the first end. Both ends have then been cemented and telescoped together. The annular bag has then been inflated within a mold and vulcanized to shape. Difficulty has been experienced in obtaining satisfactory splices by the method heretofore employed as it has been difficult to obtain effective pressure on all parts of the splice, especially at the inner face of the tube wall. It has been practically impossible to trim the telescoped ends of the tube to an intimate fit throughout and the thick-walled tube has resisted by its stiffness the conforming of the tapered faces to each other, and any pressure fluid escaping into the seam counterbalances the internal pressure on the splice resulting in a bag having a defective splice.

The present invention aims to overcome the foregoing and other difficulties.

Objects of the invention are to provide an improved splice in thick-walled tubes, to provide adequate seaming pressure at all surfaces of the splice, to provide increased seaming pressure adjacent the bore of the tubular material, to simplify and render precise the operation of preparing the ends of the tubular material, and to facilitate the step of holding the prepared ends in juxtaposition during joining.

These and other objects will appear from the following description and the accompanying drawings.

Of the drawings,

Fig. 1 is a side elevation, partly broken away and partly in section of a tube beveling apparatus of our invention and a portion of the beveled tube illustrating a step in one method.

Fig. 2 is a plan view of a clamping apparatus of our invention with the annular curing bag clamped therein illustrating another step of our method.

Fig. 3 is a sectional view taken on line 3—3 of Fig. 2.

Fig. 4 is a side elevation of the spliced bag at the splice, parts being broken away and shown in section.

Fig. 5 is a partial section showing an additional step that may be required.

According to our invention, the extruded tubular material for forming the bag is formed with a uniformly conical convex face at each end thereof so that the end faces project at the bore of the material beyond their peripheral surfaces. The cleaned and preferably cemented ends are then pressed against each other by clamping means so that greater pressure is exerted on the seam at the bore of the tube than at its periphery. Strip unvulcanized rubber material may be wound into any unclosed peripheral portion of the seam to fill it, and the bag is vulcanized in a mold under internal pressure in the presence of applied heat.

Referring to the drawings, and first to Fig. 1 thereof, this shows a power-driven rotatable spindle 10, driven by means such as electric motor 11 and having fixed thereto for rotation therewith an abrasive wheel 12. The wheel may be of emery, Carborundum, or other coarse abrasive material and has a concavely conical side face 14 exposed in the outboard direction for grinding a convex conical face on the end of the thick-walled unvulcanized rubber tube 15. To properly center and guide the tube 15 concentric with the wheel 12 a pilot bushing 18 having an outer diameter fitting the bore of the tube 15 is mounted concentrically on the spindle 10 as by an antifriction ball bearing race 17. The bushing is free to rotate relative to the spindle 10 and has a beveled shoulder 19 at the outboard end to facilitate entering the bore of the tube 15.

The tube 15 is held by the hand 20 of an operator against rotation while its bore is passed over the pilot bushing 18. As the end of the tube is forced against the conical face 14 of the wheel 12, the rubber material is ground away to provide a convex conical surface 21 thereon concentric with the tube. Furthermore, the abrasive action of the wheel 12 cleans and heats the end of the tube.

The opposite end of the tube 15 is treated in the same manner so that both ends of the tube are convexly conical.

The tubular article is then placed in a clamping mechanism illustrated in Fig. 2. The clamping mechanism comprises a supporting plate 30 having a hinge pin 31 projecting thereabove. Semi-circular clamping jaws 32, 33 are hinged to pin 31 for movement toward and from each other. These clamping jaws each consist of a flat wall 34 parallel to plate 30 and an arcuate wall 35 extending thereabove for engaging the perimeter of the tube. Hinge lugs 36 secured to the jaws engage the pin. A pair of handles 37, 38 are attached respectively to the jaws 32, 33 and are shown as representing means whereby the jaws may be forced toward and from each other, it being understood that other means such as fluid-pressure operated cylinders may be used for operating them. The interior surfaces of the jaws may be shaped to conform to the tube walls. However, it has been found that this is not necessary but may be desirable near the splicing position. For this purpose the jaws may be formed with inwardly turned flanges 40, 41 near the unpivoted ends thereof.

The tube prepared by beveling its end to provide convex end faces as hereinbefore described is bent to annular shape and placed between the jaws 32, 33 with the jaws spread apart. Prior to clamping of the tube the convex faces of the ends of the tube are preferably cleaned with a solvent of unvulcanized rubber or a thin layer of rubber cement may be applied thereto, in order that initial joining may be obtained prior to vulcanization. The handles 37, 38 or other pressure means are then operated to close the jaws forcing the tube ends into end-to-end engagement. As the tube ends have convex conical surfaces, their portions adjacent the bore of the tube receive the greatest initial pressure and such pressure causes tube material to move radially inwardly of the bore proper, increasing the wall of the tube at the bore, as seen at 42, Fig. 4.

After force has been applied to the clamping jaws to force the faces of the tube ends into initial adhering contact, the annular tube article is removed from the clamping apparatus. If, as seen in Fig. 5, a gap exists between the convex end faces at the periphery of the splice, a thin strand 43 of unvulcanized rubber material is then wound in the gap to fill it. The dimensions of the clamp are such that the ends thereof are spaced at the joint in the tube to facilitate adding strand 43. The tubular article is then confined in a closed mold (not shown) and is inflated and vulcanized. This inflation may be accomplished by means of a valve stem secured to the wall of the tube before the tube is spliced as is well known in the art.

The spliced tube is illustrated in Fig. 4 where the ends 15a, 15b of the tube 15 have been spliced at 15c. Due to the fact that the end faces of the tubular material were originally convexly conical, the thickness of the splice 15c is greater than the thickness of the tube wall and provides a strong splice in which adhesion of the end surfaces of the material at the bore of the tube are assured by the fact that they are adhered in advance of the surfaces radially outward thereof and have been subjected to greater pressure in splicing.

Variations may be made without departing from the scope of the invention as it is defined by the following claims.

We claim:

1. The method of splicing tubular articles of unvulcanized rubber material which comprises forming convex conical end faces on the tubular material, pressing two of the convex end faces against each other in axial alignment to cause progressive engagement of the end material from the radially inner margin of each convex conical end face toward the radially outer margin thereby causing material to flow radially inwardly, and vulcanizing the spliced material.

2. The method of splicing tubular articles of unvulcanized rubber material which comprises forming convex conical end faces on the tubular material, pressing two of the convex end faces against each other in axial alignment to unite them to each other adjacent the bore of the material causing progressive engagement of the end material from the radially inner margin of each convex conical face toward the radially outer margin thereby causing radially inward flow of the end material and leaving a peripheral groove, filling the groove between the end faces with unvulcanized rubber material in strip form, and vulcanizing the spliced material.

3. The method of forming a unitary toroidal tube of rubber material which comprises the steps of forming convex conical end faces on a straight length of tubular rubber-like material, confining and bending the tubular material to cause it to assume a toroidal shape and to align its end faces with each other, pressing the two end faces adjacent the bore of the tube together causing progressive engagement of the end material from the radially inner margin of each convex conical face toward the radially outer margin thereby causing radially inward flow of the end material, confining the annular body so formed within an enclosing mold, and vulcanizing the annular body.

References Cited in the file of this patent
UNITED STATES PATENTS

| | | |
|---|---|---|
| 1,828,925 | Cristopherson | Oct. 27, 1931 |
| 1,998,633 | Nichols | Apr. 23, 1935 |
| 2,073,079 | Thelar | Mar. 9, 1937 |
| 2,115,908 | Fox | May 3, 1938 |
| 2,273,463 | Campbell et al. | Feb. 17, 1942 |
| 2,339,559 | Charnes | Jan. 18, 1944 |
| 2,474,511 | Bacon | June 28, 1949 |
| 2,498,953 | Glynn | Feb. 28, 1950 |
| 2,565,703 | Strong | Aug. 28, 1951 |